United States Patent [19]

Jacobson

[11] 4,189,623
[45] Feb. 19, 1980

[54] TELEPHONE ANSWERING DEVICE HAVING SIMPLIFIED MECHANICAL CONTROLS

[76] Inventor: Sava Jacobson, 8130 Orion St., Van Nuys, Calif. 91406

[21] Appl. No.: 874,361

[22] Filed: Feb. 2, 1978

Related U.S. Application Data

[62] Division of Ser. No. 766,898, Feb. 9, 1977, Pat. No. 4,118,602.

[51] Int. Cl.² ............... H04M 1/64; F16C 11/00; G05G 1/08
[52] U.S. Cl. ............... 179/6 R; 179/100.1 R; 360/137; 403/163; 74/469
[58] Field of Search ...... 179/6 R, 100.1 DR, 100.1 R; 360/137; 74/469; 403/163

[56] References Cited

U.S. PATENT DOCUMENTS

| | | | |
|---|---|---|---|
| 3,860,963 | 1/1975 | Ueda | 179/6 R |
| 3,899,795 | 8/1975 | Watanabe | 360/137 |
| 3,909,537 | 9/1975 | Jacobson | 179/6 R |
| 4,075,395 | 2/1978 | Ohnishi | 360/137 |

*Primary Examiner*—Bernard Konick
*Assistant Examiner*—Alan Faber
*Attorney, Agent, or Firm*—Spensley, Horn, Jubas & Lubitz

[57] ABSTRACT

In this telephone answering device, each of the mechanical control arms is pivotally mounted in simplified fashion to a molded plastic chassis. Overcenter springs provide bistable mechanical positioning of each control arm. The answer-playback control arm functions to position an erase head against the incoming message recording tape, to engage or disengage the outgoing announcement tape loop drive, and to actuate a switch that connects power to the device during rewind and playback operations. A forward-rewind control arm shifts the magnetic tape drive motor to the forward or rewind position, and is linked to the answer-playback control arm by a lost motion linkage so as to ensure the correct relative settings of the two control arms.

4 Claims, 5 Drawing Figures

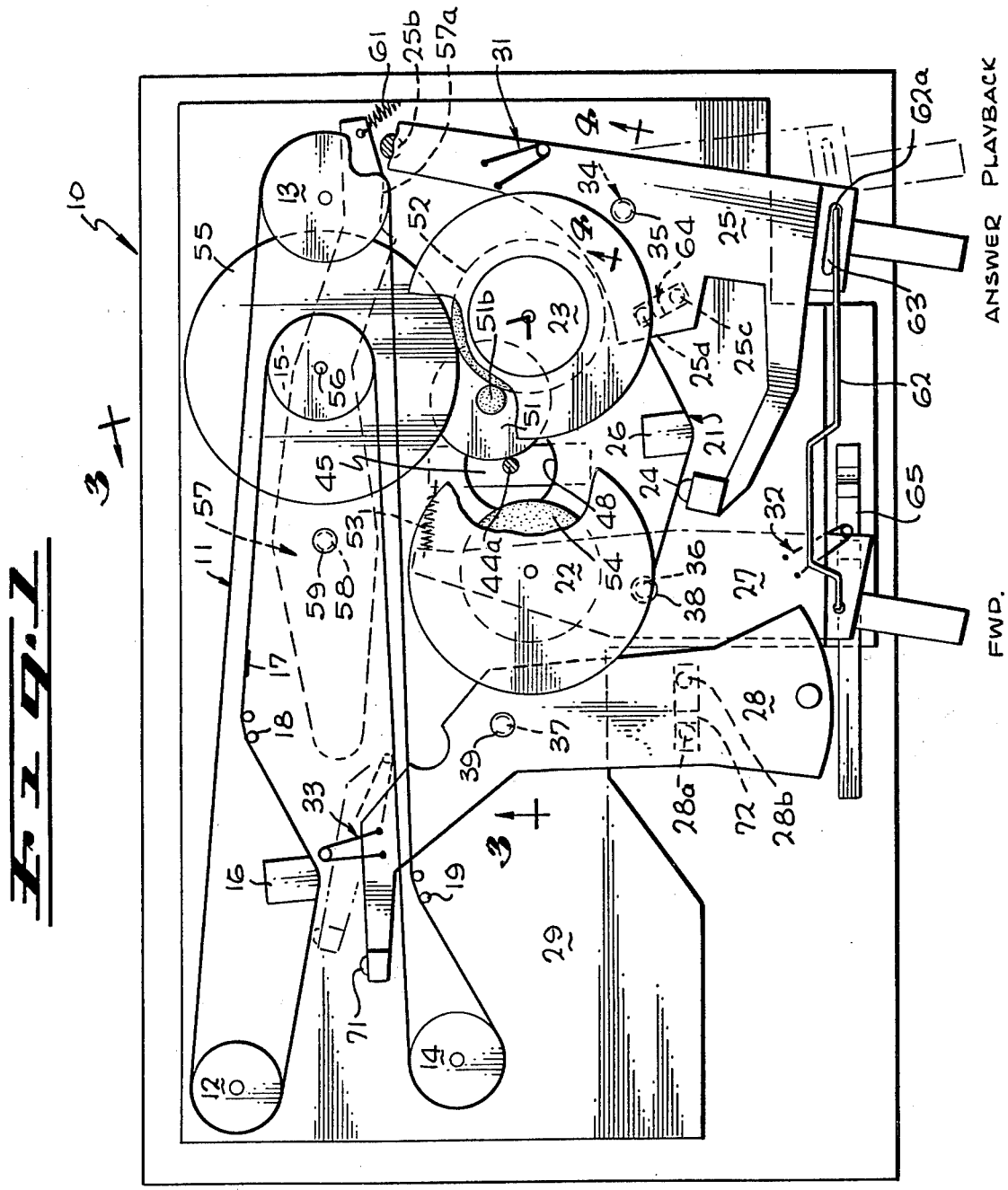

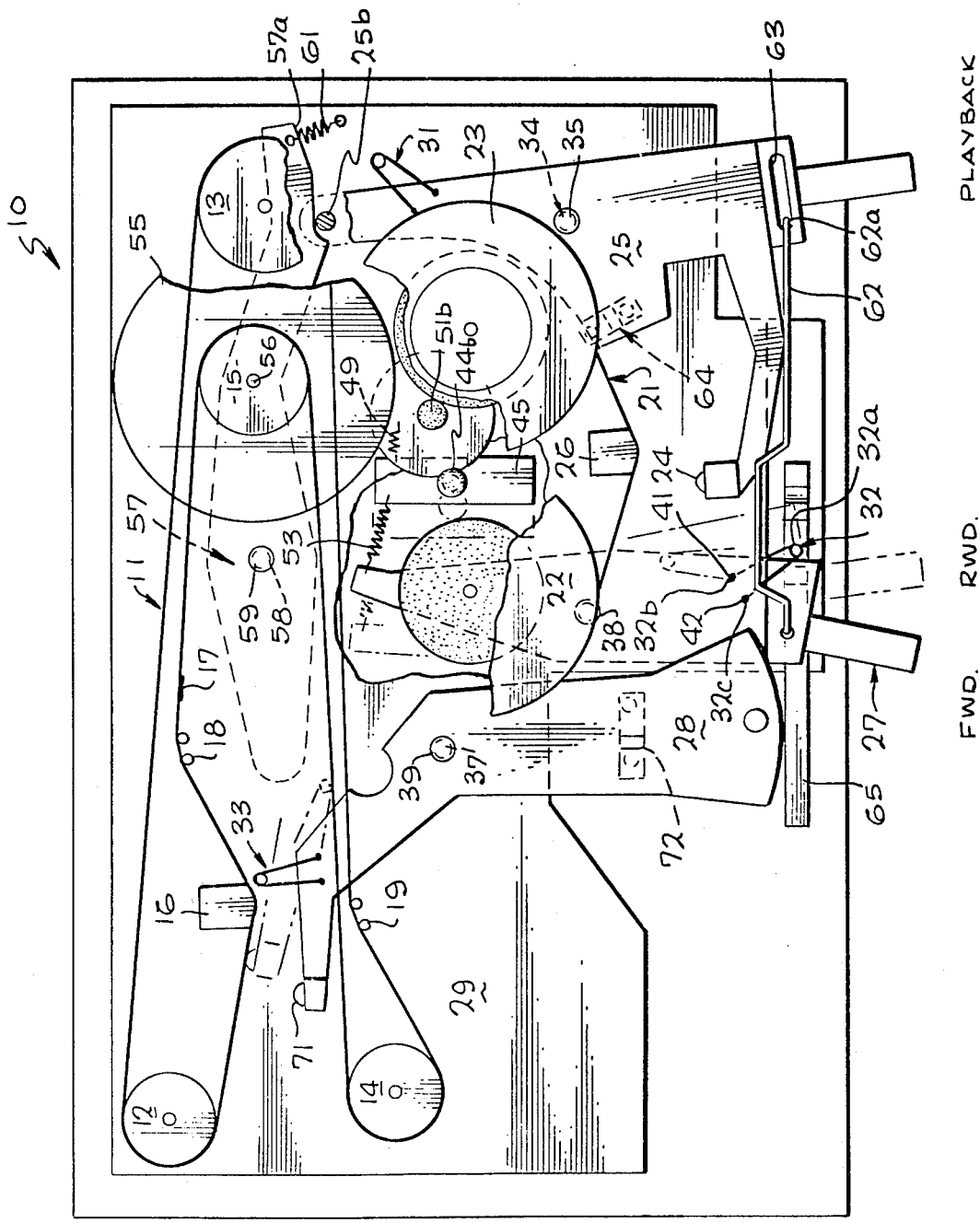

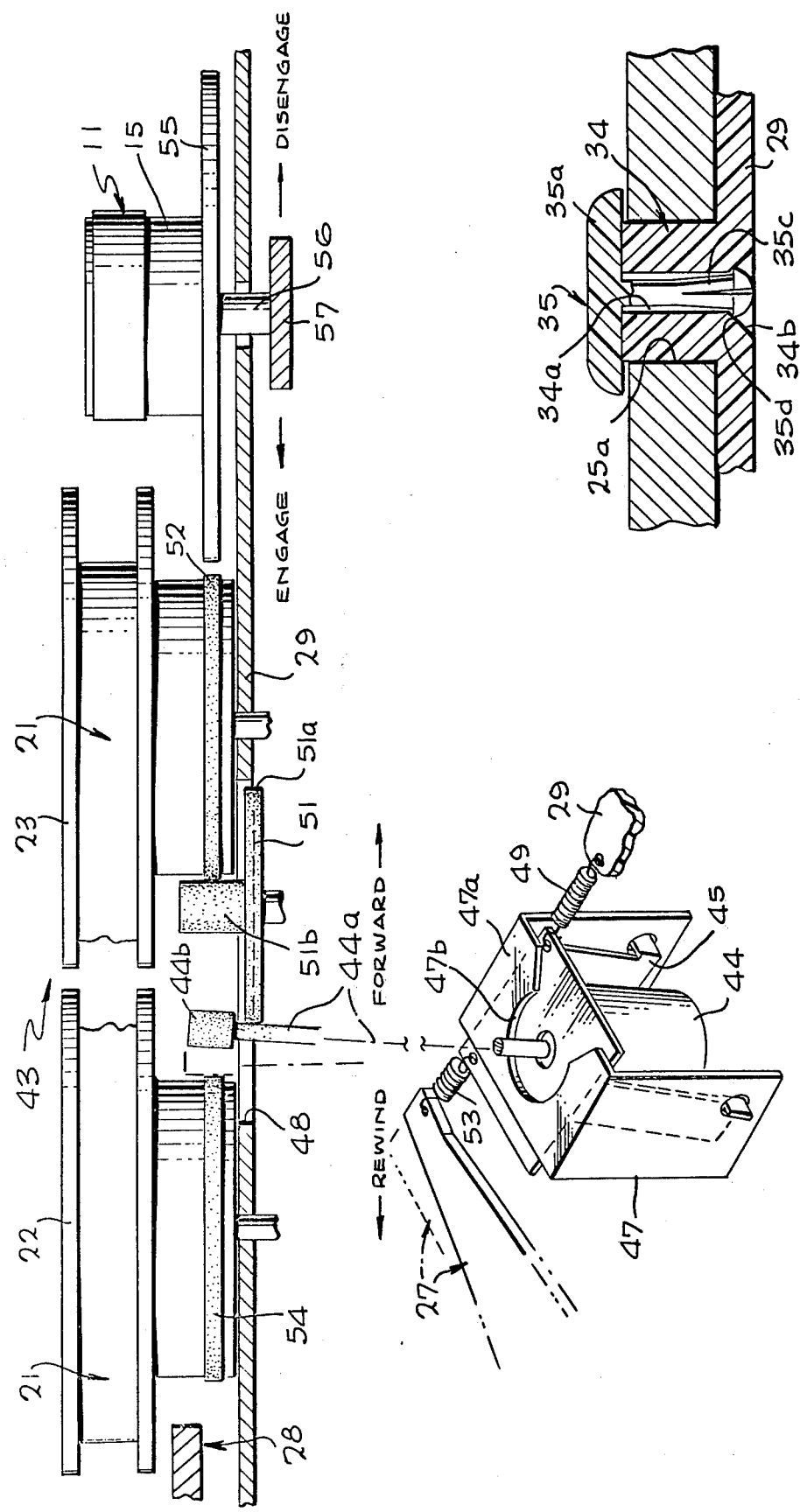

TELEPHONE ANSWERING DEVICE HAVING SIMPLIFIED MECHANICAL CONTROLS

This is a division of application Ser. No. 766,898, filed Feb. 9, 1977, now U.S. Pat. No. 4,118,602.

BACKGROUND OF THE INVENTION

1. Field of the Invention

The present invention relates to a telephone answering device having simplified mechanical controls advantageously formed of molded plastic.

2. Description of the Prior Art

The inventor's U.S. Pat. No. 3,780,226 discloses a telephone answering apparatus in which an announcement, precorded on a magnetic tape loop, is transmitted to the telephone line in response to detection of an incoming call. When the announcement is complete, the caller's message is recorded on an incoming message tape. When the user returns to his home or office, the magnetic tape is rewound, and the recorded incoming messages are played back. No call goes unanswered, and the user gets his messages even though he was not present when the call came in.

Such automatic telephone answering devices have become quite popular. However, widespread household use of such an appliance has been hindered by the cost of the answering device. An objective of the present invention is to provide a telephone answering apparatus of extremely low cost.

One of the factors which added to the cost of prior art answering units is the complexity and form of construction of the mechanical controls. A number of functions must be performed by these controls. For example, the following operations must be performed to play back the automatically recorded incoming messages:

(a) the drive mechanism for the outgoing announcement tape loop must be disengaged;

(b) the erase head used to erase the magnetic tape just prior to recording an incoming message must be removed from operative contact with the tape;

(c) the motor and drive mechanism associated with the magnetic tape must be set to rewind the tape;

(d) power to the tape drive motor must be turned on; and (e) following rewind, the motor and drive mechanism must be reset to drive the magnetic tape in a forward direction onto the takeup reel while keeping power on the motor, and while maintaining the outgoing announcement tape loop in a disengaged condition.

In addition, provision must be made to return the device to the normal answering mode after playback has been completed. Additional controls are required to facilitate the recording of a new outgoing announcement on the tape loop.

In the past, relatively complex mechanical arrangements have been required to accomplish all of these control functions. The mechanisms utilized numerous metal parts that were costly to fabricate, and both complex and time consuming to assemble. An object of the present invention is to provide a telephone answering device having very simplified mechanical controls utilizing a minimum of parts, most of which can be fabricated of molded plastic. Assembly and repair are substantially simplified. Low cost and good reliability are achieved.

SUMMARY OF THE INVENTION

These and other objectives are achieved by providing a telephone answering device in which substantially all of the mechanical components are mounted on a generally planar, molded plastic chassis. Mode control is accomplished by a set of multi-purpose, molded plastic control arms which are pivotally mounted to bosses integrally molded in the plastic chassis. An overcenter spring arrangement is used to spring-bias each control arm to one of two mechanically stable positions.

An answer-playback control arm provides the multiple functions of (1) positioning or removing an erase head from operative contact with the incoming message tape, (2) engaging or disengaging the tape loop drive, and (3) actuating a switch that provides power to the magnetic tape drive motor during playback operation. A forward-rewind control arm conditions the motor and drive mechanism to drive the magnetic tape forward onto the takeup reel, or in the reverse direction onto the source reel. A lost motion linkage between the control arms ensures correct forward/rewind positioning in the answer, rewind and playback modes.

To record a new outgoing announcement, a record announcement control arm performs the double function of (1) moving an erase head into operative contact with the tape loop during recording of a new announcement, and (2) actuating a switch that conditions the system to record the new message.

BRIEF DESCRIPTION OF THE DRAWINGS

A detailed description of the invention will be made with reference to the accompanying drawings wherein like numerals designate corresponding elements in the several figures.

FIG. 1 is a top plan view of the inventive telephone answering device with the control arms set to the automatic answering mode.

FIG. 2 is a top plan view of the answering device with the control arms set to the playback mode.

FIG. 3 is pictorial view of the magnetic tape drive mechanism and its interconnection with the forward-rewind control arm.

FIG. 4 is a transverse sectional view showing the pivotal mounting arrangement of each control arm.

DESCRIPTION OF THE PREFERRED EMBODIMENT

Figure 5:
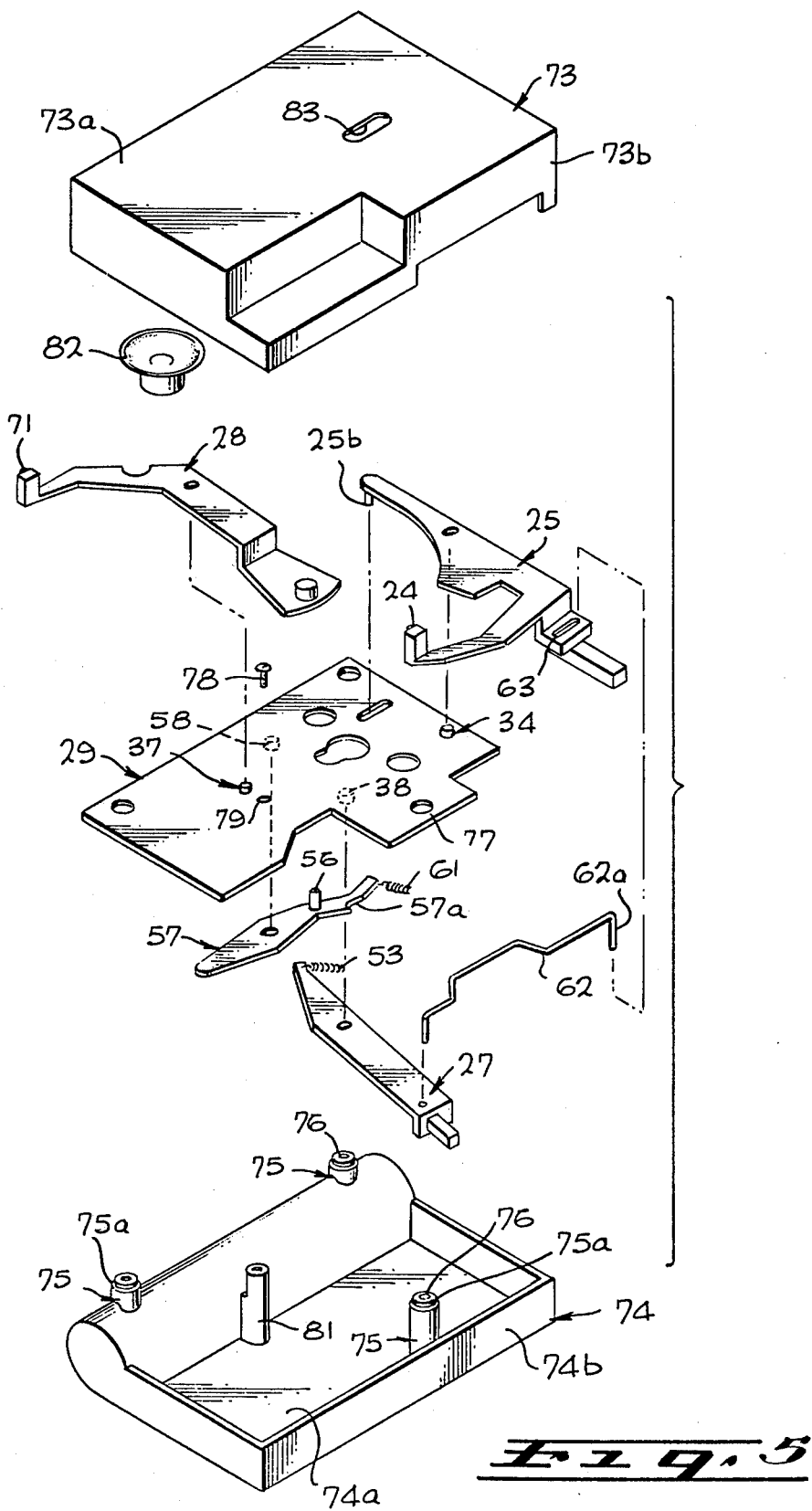
FIG. 5 is an exploded pictorial view showing the chassis and housing arrangement of the inventive telephone answering device.

The following detailed description is of the best presently contemplated mode of carrying out the invention. This description is not to be taken in a limiting sense, but is made merely for the purpose of illustrating the general principles of the invention since the scope of the invention is best defined by the appended claims.

In the inventive telephone answering device 10 of FIG. 1, the outgoing announcement is prerecorded on a tape loop 11 which winds about a set of idler wheels 12, 13, 14 and a drive wheel 15. The section of the tape loop 11 between the idler wheels 12 and 14 and around the drive wheel 15 is reentrant within the remainder of the loop 11 so as to minimize space requirements. During the announcement transmit portion of the answering cycle, the announcement is picked up by a record/playback head 16, amplified and transmitted to the telephone line. Timing of the announcement transmit and the subsequent incoming message record portions of the answering cycle is accomplished by a conductive strip 17 on the tape loop 11, in conjunction with a pair of contact posts 18 and 19.

Incoming messages are recorded on a magnetic tape 21 that is driven from a source reel 22 to a takeup reel 23. The tape 21 goes first past an erase magnet 24, mounted on an answer/playback control arm 25, and then past a record/playback head 26 to which the incoming audio is supplied.

The circuitry and operation of the device 10 in the telephone answering mode may be identical to that disclosed in the inventor's above-mentioned U.S. Pat. No. 3,780,226 entitled TELEPHONE ANSWERING APPARATUS. Alternatively, other known circuitry may be used to perform the operations of ring detection, transmission of the outgoing message, transfer of the operational mode from outgoing announcement to incoming message record, application of the incoming audio to the record/playback head 26 for recording onto the magnetic tape 21, and termination of the answering cycle after the incoming message has been recorded. Such circuitry and functions per se form no part of the present invention.

The present invention does, however, encompass the mechanical controls for the answering device 10. These include the answer-playback control arm 25 which is used to transfer the device 10 from the answer mode in which incoming telephone calls are answered automatically, to the playback mode in which incoming messages recorded on the magnetic tape 21 are played back to the user. Also included is a forward-rewind control arm 27 which is used to control the drive mechanism for the magnetic tape 21, and a record announcement control arm 28 that is used to condition the device 10 to record a new outgoing announcement. These three control arms 25, 27, 28 advantageously are formed of molded plastic, and are pivotally mounted to a generally planar, molded plastic chassis 29 which supports most of the mechanical components of the device 10. A respective overcenter spring assembly 31, 32, 33 facilitates bistable mechanical positioning of each control arm 25, 27, 28.

Each of the control arms 25, 27, 28 is pivotally mounted to the chassis 29 in a manner best illustrated in FIG. 4. As seen therein, a circular boss 34 is integrally formed in the molded plastic chassis 29. This boss 34 projects through a pivot hole 25a in the control arm 25, and extends slightly above the upper surface of that control arm 25. There is a hole 34a through the boss 34 which has a counterbored end 34b opening to the underside of the chassis 29. An expansion fastener 35, preferably made of plastic, is used to retain the arm 25 on the boss 34. To this end, the fastener 35 includes a head 35a having a diameter greater than that of the boss 34, so as to overlap an annular portion of the control arm 25 surrounding the hole 25a. The fastener shaft 35b extends through the hole 34a. The lower end 35c of the fastener shaft is split and formed in a manner so as to exert a lateral expansion force on a set of flanges 35d at the end of the fastener 35 shaft. The length of the shaft 35b is selected so that the flanges 35d will seat within, and provide a radially outward force against the counterbore 34b. This arrangment will retain the fastener 35 in position within the boss 34, but will permit the fastener 35 to be removed by pulling upward on the head 35a. In this manner, the fastener 35 can be removed easily to permit repair or replacement of the control arm 25. Moreover, initial assembly of the device 10 is simplified, since mounting requires only that the arm 25 be slipped over the boss 34 and the fastener 35 be inserted into the hole 34a.

An identical pivotal mounting arrangement is used for the control arms 27 and 28, which respectively are retained on bosses 36 and 37 by fasteners 38 and 39.

The overcenter spring arrangement used to provide bistable mechanical positioning of the control arms 25, 27, 28 is illustrated in FIG. 2. There, the forward-rewind control arm 27 is provided with a safety pin loop spring 32. This spring 32 has a generally U-shaped spring wire with a spring loop 32a at the bottom of the "U," and with first and second spring ends 32b, 32c. The end 32b is bent over and inserted in a hole 41 in the chassis 29. The other end 32c is bent in the opposite direction and inserted into a hole 42 in the control arm 27.

The hole 41 is somewhat closer to the pivotal axis of the control arm 27 than is the hole 42. As a result, when the arm 27 is moved from the forward position, shown in solid in FIG. 2, to the rewind position shown in phantom, the spring 32 will be compressed as the control arm passes the midpoint of its pivotal motion between the forward and rewind positions. That is, the spring ends 32b and 32c will be squeezed toward each other to tension the loop 32a as the control arm 27 passes the center position. Once past this midpoint, the loop 32a tension urges the control arm 27 to one of the two stable mechanical positions illustrated in FIG. 2 in which the spring 32 is relieved. Note that in these two bistable positions, the spring 32 extends in one of two generally opposite positions longitudinal of the control arm 27. The springs 31 and 33 perform a similar bistable positioning function for the respective control arms 25 and 28.

The manner in which the control arm 27 switches the magnetic tape 21 drive mechanism 43 from forward to rewind is illustrated in FIGS. 1 and 3. Referring thereto, a drive motor 44 is attached to a U-shaped bracket 45 which itself is pivotally mounted within a U-shaped support bracket 47. The upper end 47a of the bracket 47 is affixed to the underside of the chassis 29. The shaft 44a of the motor 44 projects upwardly through an opening 47b in the support bracket 47 and through an opening 48 in the chassis 29.

A relatively weak spring 49, connected between the support bracket 45 and the chassis 29, pivotally biases the motor 44 and bracket 45 to the "forward" position shown in solid in FIG. 3. In this position, the enlarged, circular end 44b of the motor shaft 44 engages the large diameter wheel 51a of an idler 51. A small diameter wheel 51b of the idler 51 in turn engages a friction disc 52 attached to the tape takeup reel 23. With this arrangement, the motor 44 drives the takeup reel 23 in the forward direction.

To shift the drive mechanism to rewind, a relatively stronger spring 53 is connected between the bracket 45 and the rear end 27a of the forward-rewind control arm 27. When the control arm 27 is moved to the rewind position shown in phantom in FIGS. 2 and 3, the stronger force of the spring 53 overcomes the bias of the weaker spring 49, and tilts the support bracket 45 and motor 44 to the rewind position shown in phantom in FIG. 3. The shaft end 44b now engages a friction disc 54 attached to the source reel 22. The motor 44 drives the source reel 22 in a direction that rewinds the magnetic tape 21. When the control arm 27 again is moved to the forward position, the force on the spring 53 is relieved, and the spring 49 once again tilts the motor 44 into the forward position.

During normal answering operation of the device 10, the tape loop 11 (FIG. 1) is rim-driven from the takeup reel 23. To this end, the tape loop drive wheel 15 (FIGS. 1 and 3) is concentrically attached to a larger wheel 52 that is rim-driven by the friction disc 52 associated with the takeup reel 23. The combined drive wheel 15 and wheel 55 rotate on a shaft 56 that is mounted on a drive wheel lever 57. This lever 57 itself is pivotally mounted to the chassis 21 by a circular boss 58 and fastener 59, in a manner like that shown in FIG. 4. A spring 61 (FIG. 1) biases the lever 57 into the tape loop engaged position in which the drive wheel 55 is rim-driven by the takeup reel 23.

During playback of recorded incoming messages, it is necessary to disengage the tape loop 11. To this end, the answer-playback control arm 25 includes a peg 25b that engages a lever surface 57a near one end of the drive wheel lever 57. When the control arm is in the answer position, the peg 25b is positioned so that the spring 61 can bias the arm 57 into the engaged position of FIG. 1. However, when the control arm is moved to the playback position illustrated in FIG. 2, the peg 25b cooperates with the lever surface 57a to pivot the lever 57 into the disengaged position in which the tape loop drive wheel 55 is out of contact with the friction disc 52 associated with the takeup reel 23. The tape loop 11 drive thus is disengaged.

The answer-playback control arm 25 provides two additional functions. As noted earlier, an erase magnet 24 is mounted on the control arm 25 in such a position that it is brought into operative contact with the tape 21 when the control arm 25 is in the answer position (FIG. 1). The erase magnet 24 then is positioned on the opposite side of the tape 21 from the record/playback head 26, between that head and the source reel 22. The erase magnet 24 operates to erase the magnetic tape 21 prior to the recording thereon of an incoming message.

Another function of the answer-playback control 25 is to actuate a switch 64 that connects power to the device 10 during rewind and playback operation. This switch is necessary, since in the normal answer mode, power to the device 10 is turned on automatically only in response to detection of a telephone ring signal. Advantageously, the switch 64 may be a conventional slide switch, the control member of which fits between a pair of depending pegs 25b, 25c that are formed integrally with the control arm 25. When the control arm 25 is moved to the playback position, the switch 64 is actuated to apply power to the motor 44 and to circuitry used to amplify the signal picked up by the record/playback head 26. When the control arm 27 is in the rewind position, another switch 65 is closed to override the regulation circuitry that is used to regulate the voltage to the motor 44, thus ensuring a constant speed for that motor during the recording and playback of incoming messages. During rewind, such speed control is not required, and by disconnecting the regulation circuitry, the full source voltage may be applied across the motor 44 to obtain maximum rewind speed.

When the tape 21 is rewound prior to playback of the recorded messages, it is necessary to withdraw the erase head 24 out of contact with the tape 21 so that the messages will not be erased during the rewind operation. To this end, a lost motion linkage 62 is provided between the control arms 25 and 27. When the control arm 27 is moved to the rewind position, the linkage 62 forces the control arm 25 to the playback shown in FIG. 2. In this position, the erase magnet 24 is spaced sufficiently far away from the tape 21 so that no erasure occurs. When the control arm 27 then is reset to the forward position, the linkage 62 does not move the control arm 25 out of the playback position. This is so because of the lost motion introduced by a slot 63 in the control arm 25 which receives the end 62a of the linkage 62. As the control arm 27 is moved to the forward position, the linkage end 62a merely moves within the slot 63 without imparting motion to the control arm 25. The result is that the device 10 now is conditioned to play back the recorded messages, with the control arms 25 and 27 respectively in the playback and forward position shown in solid in FIG. 2.

During playback of the recorded incoming messages, the control arm 25 is in the playback position and the control arm 27 is in the forward position. When all of the messages have been played back, the magnetic tape 21 can be rewound by moving the control 27 to the rewind position. The control arm 25 will remain in the playback position. When all of the magnetic tape has been wound back onto the source reel 22, the device 10 can be conditioned once again to answer incoming calls merely by moving the control arm 25 to the answer position. The linkage 62 simultaneously will move the control arm 27 to the required forward position. Automatic telephone answering is ready to begin.

To record a new outgoing announcement on the tape loop 11, the control arm 28 is moved to the record announcement position shown in phantom in FIG. 1. In this position, an erase magnet 71 is moved into operative contact with the loop tape on the opposite side of the record/playback head 16. This magnet 71 then serves to erase the previously recorded announcement as the new announcement is recorded on the tape loop.

The control arm 28 also actuates a switch 72 which conditions the circuitry to record a new message. Advantageously, the switch 72 is of the slide-type and has a control member that is situated between a pair of pegs 28a, 28b depending from, and formed integrally with the control arm 28. During the recording of a new announcement, the control arm 25 is placed in the answer position so that the tape loop 11 will be driven by the motor 44 via the rim drive wheel 55, as described above. As shown in FIG. 5, the chassis 29 which supports most of the components of the answering device 10, may be mounted within a housing formed by molded plastic top and bottom sections 73, 74. Each of these sections 73, 74 has a respective top or bottom outer wall 73a, 74a and sidewalls 73b, 74b. Extending upwardly within the bottom section 74 are a set of stanchions 75 each having a centering boss 76 at the upper end thereof. Each centering boss 76 is of smaller diameter than the stanchion 75 so as to form an annular shoulder 75a on each stanchion 75. The height of each boss 76 above the stanchion 75a is approximately one-half the thickness of the planar chassis 29. An identical set of stanchions (hidden from view in FIG. 5) project downwardly within the top housing section 73.

The chassis 29 includes a corresponding set of holes 77 into which the centering bosses 76 project. The diameter of each hole 77 is greater than the diameter of the boss 76, but less than the diameter of the stanchion 75. In this way, the chassis 29 will be supported on the stanchion shoulders 75a, with enough tolerance to compensate for slight warpage of the chassis 29. To fasten the chassis 29 to the lower housing section 74, a screw 78 extends through a hole 79 in the chassis 29 into a threaded hole within another stanchion 81 formed in the bottom section 74. The top housing section 73 then seats atop the chassis 29 with the bosses of its stanchions also projecting halfway downward into the same holes 77. Another fastener (not shown) holds the top section 73 in place. A speaker 82 may be mounted within the top housing section 73 to reproduce the messages played back from the magnetic tape 21. A window 83 in the top 73a permits the user to see how much tape has been wound onto the takeup reel 23, giving the user a rough estimate of the number of message which have been received.

Intending to claim all novel, useful and unobvious features, shown or described, the inventor claims:

1. In a telephone answering device, the improvement comprising:

a molded plastic chassis, a forward-rewind control arm and an answer-playback control arm each having a pivot hole therethrough, said forward-rewind control arm being connected to transfer the incoming message record mechanism of said device between forward and reverse drive positions, said answer-playback control arm being connected to transfer said device between an answer mode in which incoming calls are recorded and a playback mode in which previously recorded incoming messages are played back, said chassis having integrally molded first and second circular bosses therein, each such boss extending through the pivot hole of a corresponding control arm to provide a pivotal mounting therefor, an overcenter spring means connecting each of said control arms to said chassis, for spring-biasing the respective control arm to one of two mechanically stable positions, each comprising:

a safety-pin type loop spring having a generally U-shaped spring wire with first and second free ends and a spring loop at the bottom of said "U,"

a first free end of said loop spring being pivotally attached to said control arm at a first distance from the pivotal axis thereof, and a second free end of said loop spring being pivotally attached to said chassis at a slightly different distance from said pivotal axis so that when said control arm is in mid-position between its alternate stable positions, said spring loop will extend generally transversely of said arm with said spring loop compressed, and when said arm is moved past said mid-position to either of said two stable positions, said spring loop will extend generally longitudinally of said control arm in one of a respective two positions in which said spring is relieved.

2. A telephone answering device according to claim 1, wherein each control arm is formed of plastic and wherein:

the height of each such pivotal mounting boss is slightly greater than the thickness of the associated control arm so that the free end of each boss extends beyond the surface of said arm, each such boss having a hole therethrough, said hole being enlarged at the end opposite the end extending into said arm, and an expansion fastener extending through each such hole, said fastener having a head diameter that is greater than that of said boss so as to radially overlap a portion of the respective control arm to hold that arm on said boss, the other, expandable end of said fastener expanding within the enlargement for removable retention of said fastener in said boss.

3. A telephone answering device according to claim 1 wherein said plastic chassis is substantially planar and wherein substantially all of the operative components of said device are mounted to said chassis, all pivotable components being mounted to circular bosses integrally formed in said chassis, said device further comprising a housing having molded plastic top and bottom sections each having a respective top and bottom outer wall and side walls and each having integrally molded, opposed stanchions, the free ends of each stanchion having a circular centering boss of smaller diameter than said stanchion, there being an annular shoulder on each stanchion surrounding said centering boss, the height of each such centering boss being about one-half the thickness of said planar chassis, said chassis being sandwiched between said top and bottom sections, said chassis having centering holes therein into which said centering bosses project, the diameter of said centering holes being greater than the diameter of said centering bosses but less than the diameter of said stanchions so that said chassis is supported between said shoulders and positioned with respect to said housing by said centering bosses.

4. A telephone answering device having a molded plastic chassis and at least one control arm formed of plastic, said chassis having, for each control arm, an integrally molded circular boss that extends through a pivot hole in the corresponding control arm to provide a pivotal mounting therefor, the height of each such pivotal mounting boss being slightly greater than the thickness of the corresponding control arm so that the free end of each boss extends beyond the surface of said arm, each such boss having a hole therethrough, and an expansion fastener extending through each such hole, said fastener having a head diameter that is greater than that of said boss so as to radially overlap a portion of the respective control arm to hold that arm on said boss, the other, expandable end of said fastener expanding with respect to said hole for removable retention of said fastener in said boss.

* * * * *